(12) United States Patent
Fan et al.

(10) Patent No.: US 11,054,734 B2
(45) Date of Patent: Jul. 6, 2021

(54) OPTICAL ELEMENT AND PROJECTION APPARATUS

(71) Applicant: Coretronic Corporation, Hsin-Chu (TW)

(72) Inventors: Chen-Wei Fan, Hsin-Chu (TW); Ming-Tsung Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/879,762

(22) Filed: May 21, 2020

(65) Prior Publication Data

US 2020/0371417 A1    Nov. 26, 2020

(30) Foreign Application Priority Data

May 24, 2019    (CN) .......................... 201910437492.3

(51) Int. Cl.
*G03B 21/20*    (2006.01)

(52) U.S. Cl.
CPC ......... *G03B 21/208* (2013.01); *G03B 21/204* (2013.01)

(58) Field of Classification Search
CPC .......................... G03B 21/208; G03B 21/204; G03B 21/2033; F21V 9/30; F21V 9/38; F21V 9/32; G02B 5/204; G02B 26/00; G02B 26/007; G02B 26/008
See application file for complete search history.

(56) References Cited

U.S. PATENT DOCUMENTS

| 2015/0219984 | A1  | 8/2015 | Matsubara |
| 2018/0059403 | A1* | 3/2018 | Takamatsu ........... H04N 9/3161 |
| 2018/0224732 | A1* | 8/2018 | Tian .................... G02B 27/1006 |
| 2019/0072839 | A1* | 3/2019 | Zhao .................... G03B 21/204 |

FOREIGN PATENT DOCUMENTS

| CN | 1825197 | 8/2006 |
| CN | 101813297 | 3/2012 |
| CN | 101878652 | 1/2013 |
| CN | 104516180 | 4/2015 |
| CN | 204730123 | 10/2015 |
| CN | 108287449 | 7/2018 |

(Continued)

OTHER PUBLICATIONS

"Office Action of China Counterpart Application", dated Apr. 30, 2021, p. 1-p. 9.

*Primary Examiner* — Bao Q Truong
(74) *Attorney, Agent, or Firm* — JCIPRNET

(57) ABSTRACT

An optical element disposed between a light homogenizing element and a converging lens is provided. The optical element includes at least two regions. The at least two regions include a first region and a second region. The first region and the second region respectively adjust focus positions of a first beam formed through the first region and a second beam formed through the second region to substantially the same position. The first beam and the second beam have different wavelengths, and the first region and the second region meet at least one of the following conditions: the thicknesses of the first region and the second region are different; and the refractive indices of the first region and the second region are different. A projection apparatus including the optical element is also provided.

22 Claims, 12 Drawing Sheets

(56) References Cited

FOREIGN PATENT DOCUMENTS

| | | |
|---|---|---|
| CN | 208547769 | 2/2019 |
| CN | 109426056 | 3/2019 |
| CN | 209746344 | 12/2019 |
| JP | H0686017 | 3/1994 |
| JP | 2006065057 | 3/2006 |

* cited by examiner

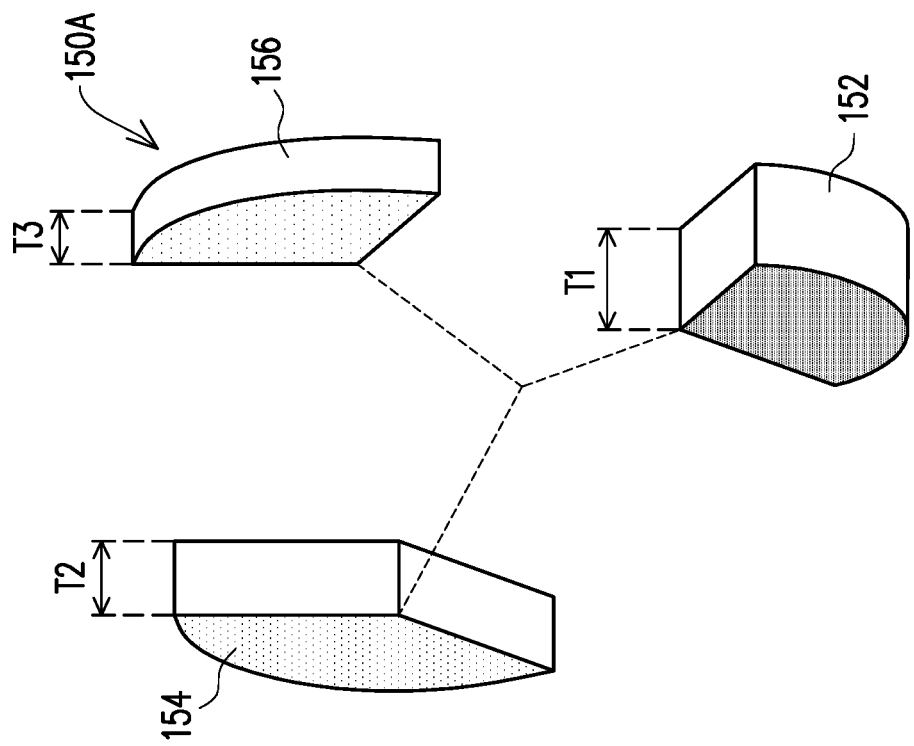
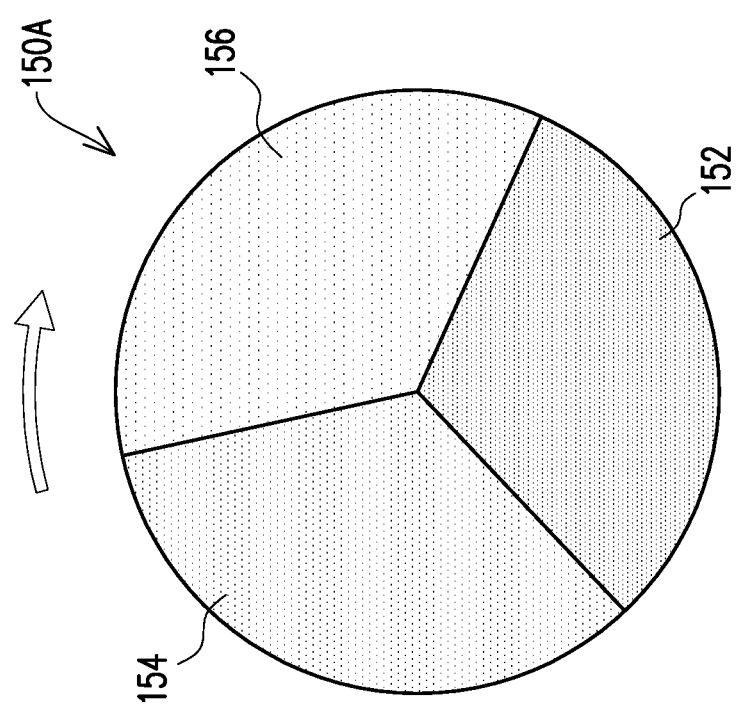
FIG. 3B
FIG. 3A

OPTICAL ELEMENT AND PROJECTION APPARATUS

CROSS-REFERENCE TO RELATED APPLICATION

This application claims the priority benefit of China application serial no. 201910437492.3, filed on May 24, 2019. The entirety of the above-mentioned patent application is hereby incorporated by reference herein and made a part of this specification.

BACKGROUND

Technical Field

The invention relates to an optical element and a projection apparatus using the optical element.

Description of Related Art

The imaging principle of a projection apparatus is that an illumination beam generated by an illumination system is converted into an image beam by a light valve, and then an image beam is projected onto a screen through a projection lens to form an image picture. Specifically, the illumination system inputs a plurality of beams having different color lights to a focusing lens along the same optical axis, so that the beams are concentrated and then enter a light integration rod, and then homogenized by the light integration rod to form the illumination beam and the illumination beam is directed to the light valve.

However, since a lens has different refractive indices for beams having different wavelengths, the refractive index of the lens is lower for a beam having a longer wavelength, and the refractive index of the lens is higher for a beam having a shorter wavelength, so that the lens has different focal lengths for beams having different wavelengths. Therefore, a plurality of beams having different color lights cannot be focused at the same position on the optical axis in front of the light integration rod, forming a longitudinal chromatic aberration, thereby causing the light integration rod to be incapable of effectively homogenizing the light.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides an optical element capable of eliminating a longitudinal chromatic aberration produced by beams having different wavelengths after the beams pass through a converging lens.

The invention provides a projection apparatus having good imaging quality.

Other objectives and advantages of the invention may be further understood from the technical features disclosed in the invention.

In order to achieve one, some, or all of the aforementioned objectives or other objectives, an embodiment of the invention provides an optical element disposed between a light homogenizing element and a converging lens. The optical element comprises at least two regions. The at least two regions comprise a first region and a second region. The first region and the second region respectively adjust focus positions of a first beam formed through the first region and a second beam formed through the second region to substantially the same position. The first beam and the second beam have different wavelengths, and the first region and the second region meet at least one of the following conditions: the thicknesses of the first region and the second region are different; and the refractive indices of the first region and the second region are different.

In order to achieve one, some, or all of the aforementioned objectives or other objectives, an embodiment of the invention provides a projection apparatus, comprising an illumination system, a light valve and a projection lens. The illumination system is configured to emit an illumination beam. The illumination system comprises a light source module, a converging lens, a light homogenizing element and the optical element described above. The converging lens is disposed on a transmission path of the light source beam. The light homogenizing element is disposed on the transmission path of the light source beam from the converging lens. The light valve is disposed on a transmission path of the illumination beam to modulate the illumination beam into an image beam. The projection lens is disposed on a transmission path of the image beam.

Based on the above, the first region and the second region of the optical element of the embodiment of the invention meet at least one of the following conditions: the thicknesses of the first region and the second region are different; and the refractive indices of the first region and the second region are different. That is, by adjusting the thickness and/or the refractive index of the first region and the second region of the optical element, the focus positions of the beams having different wavelengths formed through the first region and the second region can be respectively adjusted. Therefore, the first region and the second region of the optical element can respectively adjust the focus positions of the first beam formed through the first region and the second beam formed through the second region to substantially the same position, thereby eliminating the longitudinal chromatic aberration produced by the beams having different wavelengths after the beams pass through the converging lens to improve color uniformity. The projection apparatus of the embodiment of the invention comprises the above-described optical element, and thus, can have good imaging quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A is a schematic front view of an optical element according to an embodiment of the invention.

FIG. 3B is an oblique exploded view of the optical element of FIG. 3A.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
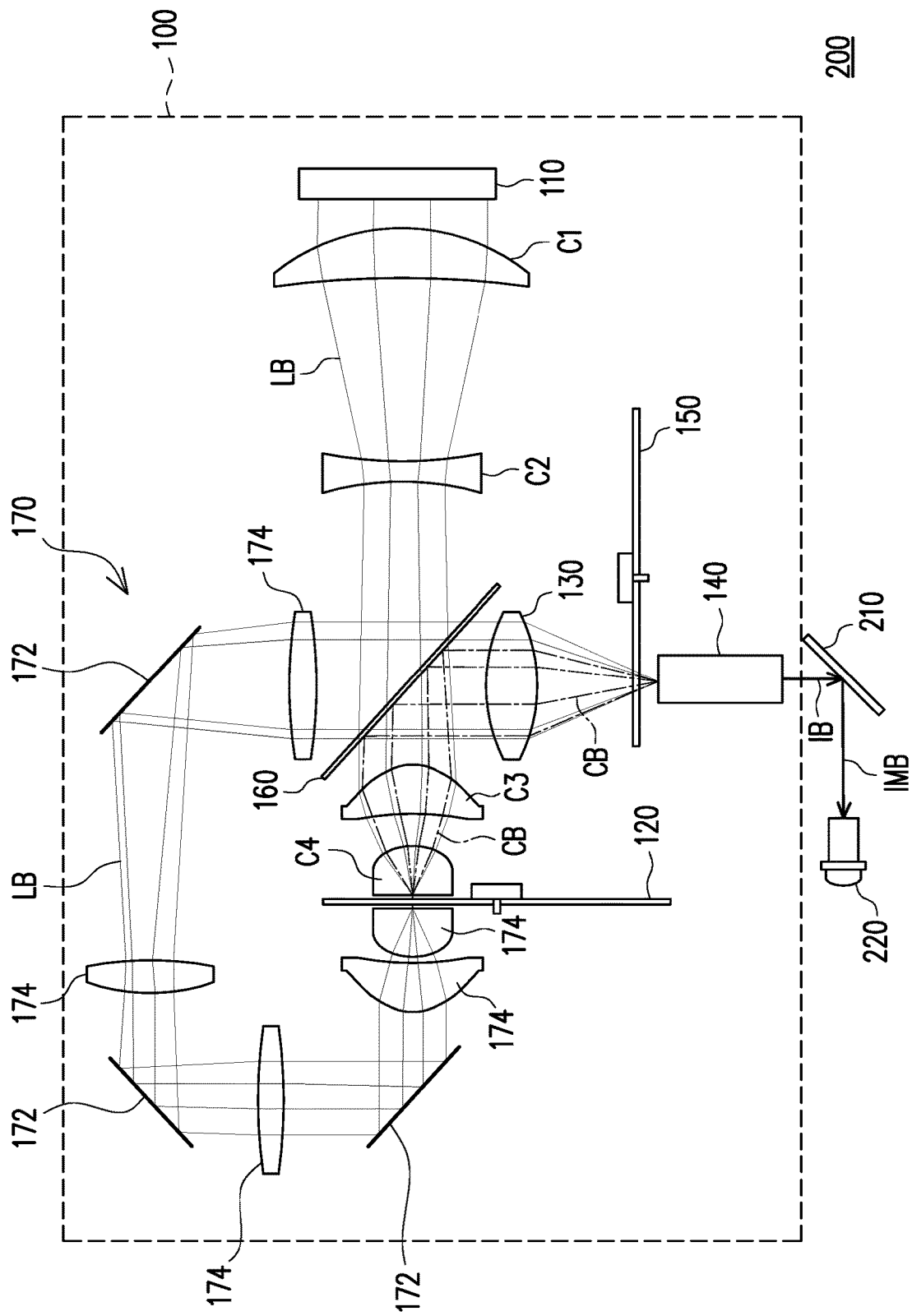
FIG. 1 is a schematic view of a projection apparatus according to a first embodiment of the invention.

FIG. 1 is a schematic view of a projection apparatus according to a first embodiment of the invention. Referring first to FIG. 1, the projection apparatus 200 of the embodiment includes an illumination system 100, a light valve 210 and a projection lens 220. The illumination system 100 is configured to emit an illumination beam IB. The light valve 210 is disposed on a transmission path of the illumination beam IB to modulate the illumination beam IB into an image beam IMB. The projection lens 220 is disposed on a transmission path of the image beam 1 MB and is configured to project the image beam 1 MB onto a screen or a wall (not shown) to form an image picture. After the illumination beams IB of different colors irradiate the light valve 210, the light valve 210 converts the illumination beams IB of different colors into the image beams IMB and transmits the image beams IMB to the projection lens 220 in time sequence. Therefore, the image picture formed from the image beams IMB converted by the light valve 210 projected by the projection apparatus 200 become a color picture.

In the embodiment, the light valve 210 is, for example, a digital micro-mirror device (DMD) or a liquid-crystal-on-silicon panel (LCOS panel). However, in other embodiments, the light valve 210 is also a transmissive liquid crystal panel or other spatial light modulators. In the embodiment, the projection lens 220 is, for example, a combination including one or more optical lenses having dioptric power, and the optical lens includes, for example, a biconcave lens, a biconvex lens, a concave-convex lens, a convex-concave lens, a plano-convex lens, a plano-concave lens, and other non-planar lenses or various combinations thereof. The invention does not limit the shape and type of the projection lens 220.

In the embodiment, the illumination system 100 includes a light source module 110, a wavelength conversion element 120, a converging lens 130, a light homogenizing element 140 and an optical element 150. The light source module 110 is configured to emit a light source beam LB. The wavelength conversion element 120, the converging lens 130, the light homogenizing element 140 and the optical element 150 are all disposed on a transmission path of the light source beam LB. The optical element 150 is disposed between the light homogenizing element 140 and the converging lens 150.

In the embodiment, the light source module 110 is generally referred to a light source capable of emitting a short-wavelength beam. The peak wavelength of the short-wavelength beam falls, for example, within a wavelength range of blue light or a wavelength range of ultraviolet light. The peak wavelength is defined as the wavelength corresponding to the maximum light intensity. The light source module 110 includes a laser diode (LD), a light emitting diode (LED), or an array or bank or a group of one of the above two, and the invention is not limited thereto. In the embodiment, the light source module 110 is a laser emitting element including a laser diode. For example, the light source module 110 is, for example, a blue laser diode bank, and the light source beam LB is a blue laser beam, but the invention is not limited thereto.

Figure 2B:
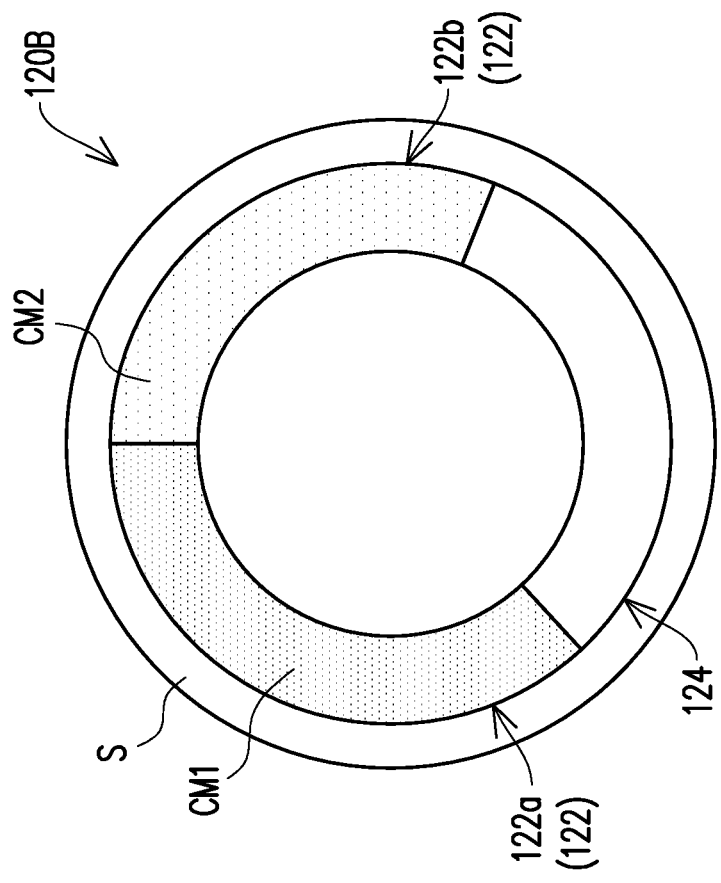
FIG. 2B is a schematic front view of a wavelength conversion element according to another embodiment of the invention.
Figure 2A:
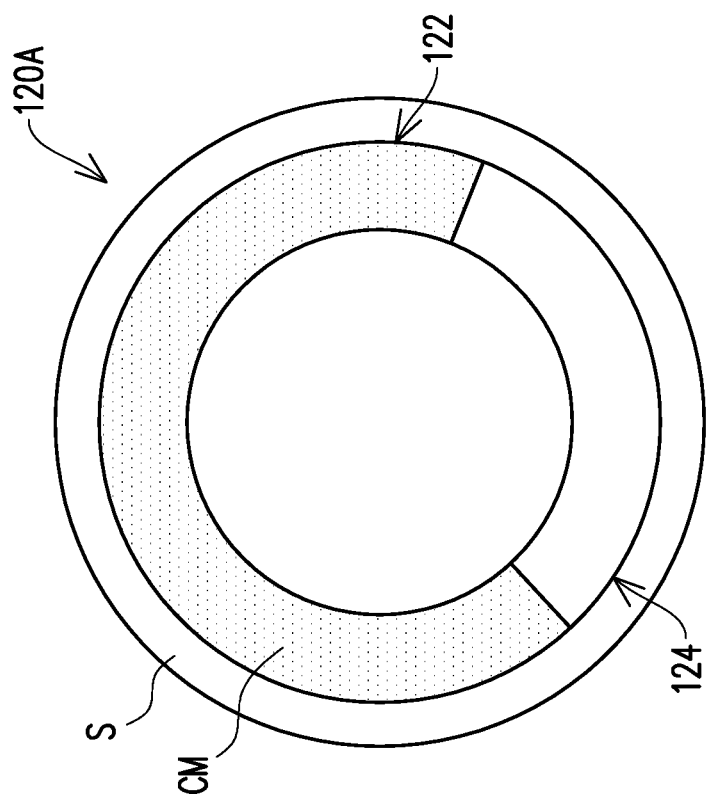
FIG. 2A is a schematic front view of a wavelength conversion element according to an embodiment of the invention.

FIG. 2A is a schematic front view of a wavelength conversion element according to an embodiment of the invention. FIG. 2B is a schematic front view of a wavelength conversion element according to another embodiment of the invention. The wavelength conversion element 120 in FIG. 1 is any one of the wavelength conversion element 120A shown in FIG. 2A and the wavelength conversion element 120B shown in FIG. 2B.

Referring to FIG. 1 and FIG. 2A, in the embodiment, the wavelength conversion element 120A is a rotatable disk-like element, for example, a phosphor wheel. The wavelength conversion element 120A includes a wavelength conversion region 122 and an optical region 124, and converts a short-wavelength beam transmitted to the wavelength conversion region 122 into a long-wavelength beam. Specifically, the wavelength conversion element 120A includes a substrate S. The substrate S includes a wavelength conversion region 122 and an optical region 124 that are annularly arranged, and the substrate S is, for example, a reflective substrate. At least one wavelength conversion material is disposed in the wavelength conversion region 122 (FIG. 2A is an example of one wavelength conversion material CM), and the wavelength conversion material CM is, for example, a phosphor that generates a yellow beam. The optical region 124 is, for example, a transmissive region, which is a region formed by a transparent plate embedded in the substrate S, or a through hole penetrating the substrate S. In the embodiment, the wavelength conversion region 122 and the optical region 124 alternately cut into the transmission path of the light source beam LB. When the wavelength conversion region 122 cuts into the transmission path of the light source beam LB, the wavelength conversion material CM is excited by the light source beam LB to emit a converted beam CB, and the converted beam CB is reflected by the substrate S. The converted beam CB is, for example, a yellow beam. When the optical region 124 cuts into the transmission path of the light source beam LB, the light source beam LB penetrates the optical region 124 of the wavelength conversion element 120A and is output from the optical region 124.

Referring to FIG. 1 and FIG. 2B, the wavelength conversion element 120B of FIG. 2B is similar to the wavelength conversion element 120A of FIG. 2A, except that two wavelength conversion materials are disposed in the wavelength conversion region 122 of the wavelength conversion element 120B in FIG. 2B. In detail, the wavelength conversion region 122 of the wavelength conversion element 120B includes a first conversion region 122a and a second conversion region 122b, and the first conversion region 122a and the second conversion region 122b are respectively provided with two different wavelength conversion materials, a wavelength conversion material CM1 and a wavelength conversion material CM2. The wavelength conversion material CM1 is, for example, a phosphor that generates a green beam, and the wavelength conversion material CM2 is, for example, a phosphor that generates a yellow beam or a red beam. When the first conversion region 122a of the wavelength conversion region 122 cuts into the transmission path of the light source beam LB, the wavelength conversion material CM1 is excited by the light source beam LB to emit a converted beam CB such as a green beam. When the second conversion region 122b of the wavelength conversion region 122 cuts into the transmission path of the light source beam LB, the wavelength conversion material CM2 is excited by the light source beam LB to emit a converted beam CB such as a yellow beam or a red beam, but the invention is not limited thereto.

Figure 4B:
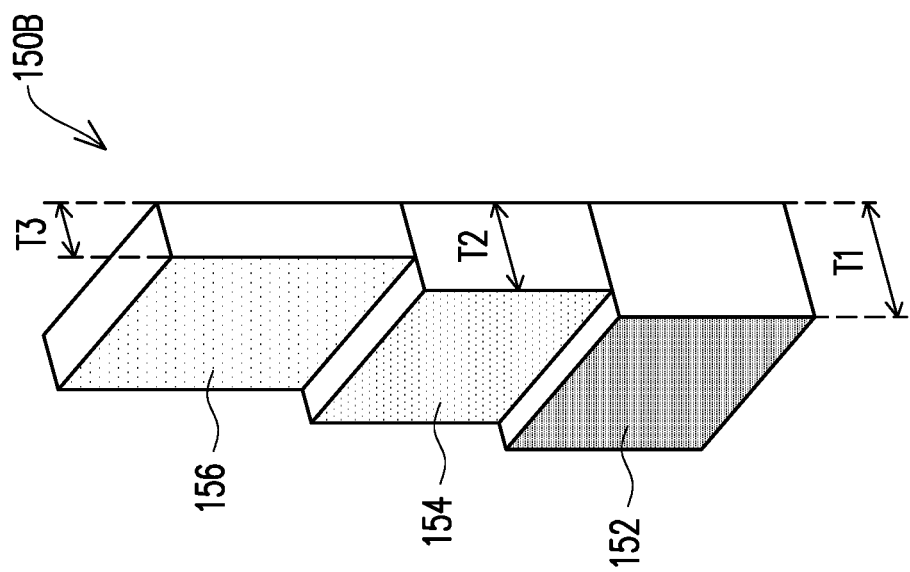
FIG. 4B is an oblique view of the optical element of FIG. 4A.
Figure 4A:
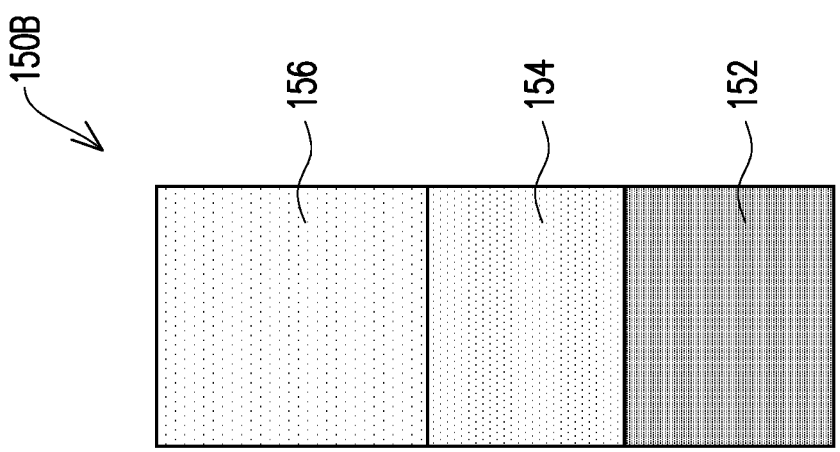
FIG. 4A is a schematic front view of an optical element according to another embodiment of the invention.
Figure 5B:
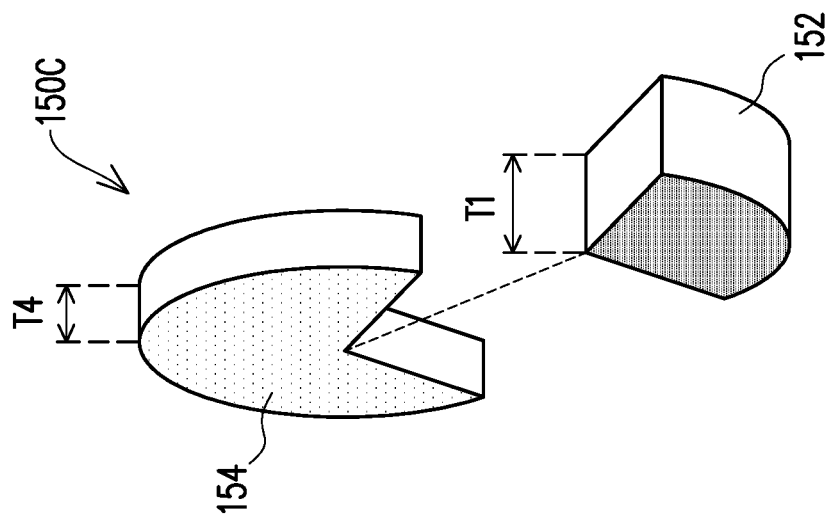
FIG. 5B is an oblique exploded view of the optical element of FIG. 5A.
Figure 5A:
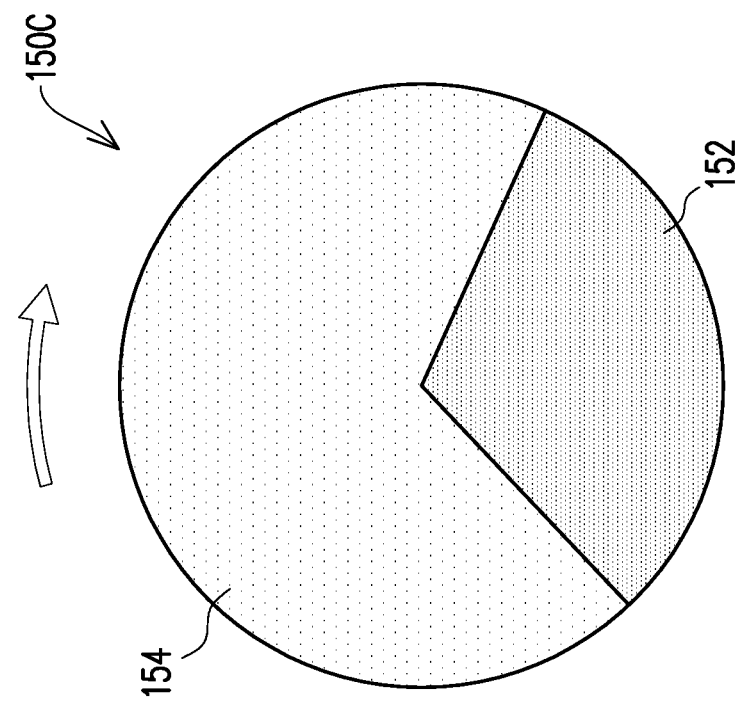
FIG. 5A is a schematic front view of an optical element according to still another embodiment of the invention.
Figure 6B:
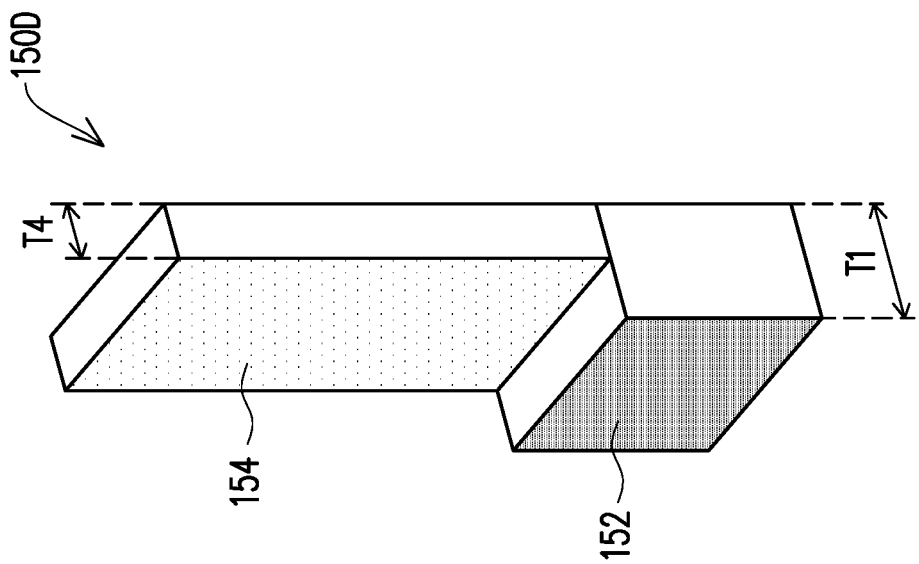
FIG. 6B is an oblique view of the optical element of FIG. 6A.
Figure 6A:
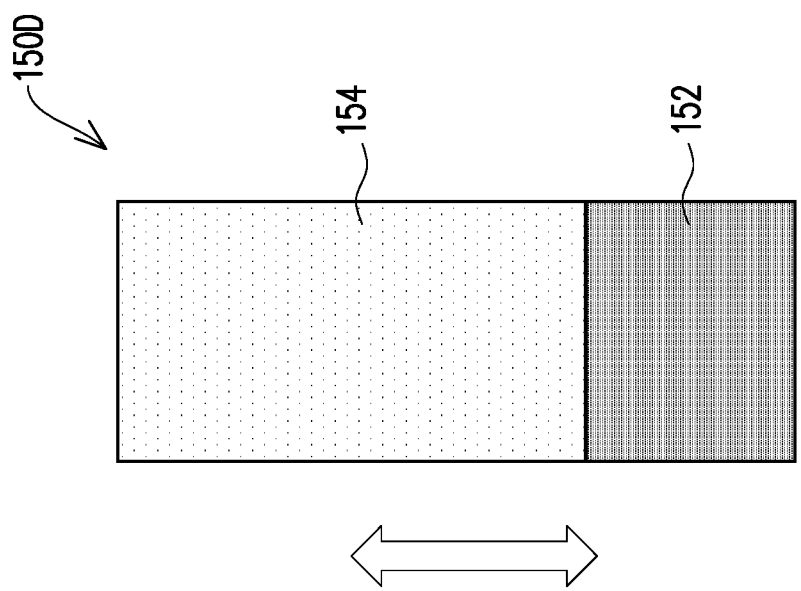
FIG. 6A is a schematic front view of an optical element according to yet another embodiment of the invention.

FIG. 3A is a schematic front view of an optical element according to an embodiment of the invention. FIG. 3B is an oblique exploded view of the optical element of FIG. 3A. FIG. 4A is a schematic front view of an optical element according to another embodiment of the invention. FIG. 4B is an oblique view of the optical element of FIG. 4A. FIG. 5A is a schematic front view of an optical element according to still another embodiment of the invention. FIG. 5B is an oblique exploded view of the optical element of FIG. 5A. FIG. 6A is a schematic front view of an optical element according to yet another embodiment of the invention. FIG. 6B is an oblique view of the optical element of FIG. 6A. The optical element 150 in FIG. 1 is any one of the optical element 150A shown in FIG. 3A and FIG. 3B, the optical element 150B shown in FIG. 4A and FIG. 4B, the optical element 150C shown in FIG. 5A and FIG. 5B, and the optical element 150D shown in FIG. 6A and FIG. 6B.

Referring first to FIG. 3A and FIG. 3B, in the embodiment, the optical element 150A is a rotatable disk-like element, for example, a filter wheel. The optical element 150A is configured to filter out (reflect or absorb) a beam other than the beam of a specific wavelength range and enable the beam of the specific wavelength range to pass, and the color purity of the color light is increased to form the illumination beam IB. The optical element 150A includes a first region 152, a second region 154 and a third region 156. At least one of the first region 152, the second region 154 and the third region 156 is a filter region. For example, the first region 152 is a light transmissive region, and is configured, for example, with a diffuser, a diffusion particle, or a diffusion structure for reducing or eliminating a laser speckle phenomenon of the light source beam LB. The first region 152 is also a blue filter region for being penetrated by a beam having a blue band range and filtering out beams of other band ranges. The second region 154 is also a green filter region for being penetrated by a beam having a green band range and filtering out beams of other band ranges. The third region 156 is also a red filter region for being penetrated by a beam having a red band range and filtering out beams of other band ranges.

In detail, in the embodiment, the optical element 150A is configured to rotate about a rotation axis thereof such that the first region 152 of the optical element 150A and the second region 154 and the third region 156 of the optical element 150A sequentially cut into the transmission paths of the light source beam LB and the converted beam CB from the wavelength conversion element 120 respectively. When the first region 152 cuts into the transmission path of the light source beam LB, the light source beam LB passes through the first region 152 or is filtered to form a blue beam. When the second region 154 and the third region 156 sequentially cut into the transmission path of the converted beam CB, the converted beam CB is sequentially filtered to form a green beam and a red beam. It should be noted that when the wavelength conversion element 120 in FIG. 1 is the wavelength conversion element 120A shown in FIG. 2A, the first region 152 of the optical element 150A corresponds to the optical region 124 of the wavelength conversion element 120A, and the second region 154 and the third region 156 of the optical element 150A correspond to the wavelength conversion region 122 of the wavelength conversion element 120A. When the wavelength conversion element 120 of FIG. 1 is the wavelength conversion element 120B shown in FIG. 2B, the first region 152 of the optical element 150A corresponds to the optical region 124 of the wavelength conversion element 120B, and the second region 154 and the third region 156 of the optical element 150A respectively correspond to the first conversion region 122a and the second conversion region 122b of the wavelength conversion element 120B. Here, the areas of the first region 152, the second region 154 and the third region 156 of the optical element 150A may be different or the same.

In the embodiment, the first region 152, the second region 154 and the third region 156 meet at least one of the following conditions: the thicknesses of at least two of the first region 152, the second region 154 and the third region 156 are different; and the refractive indices of at least two of the first region 152, the second region 154 and the third region 156 are different. The first region 152 of the optical element 150A and the second region 154 and the third region 156 of the optical element 150A respectively adjust the focus positions of the light source beam LB and the converted beam CB to substantially the same position. Further, the first region 152, the second region 154 and the third region 156 respectively adjust the focus positions of a first beam (e.g., a blue beam) formed through the first region 152, a second beam (e.g., a green beam) formed through the second region 154 and a third beam (e.g., a red beam) formed through the third region 156 to substantially the same position. Here, the focus position is a position where a speckle formed by the beams has the minimum size, but it should be noted that the minimum size of the respective speckles of the different beams is not the same, for example, the minimum size of the speckle of the converted beam CB is a little larger than the minimum size of the speckle of the light source beam LB because the converted beam CB scatters. Therefore, in an embodiment, the speckles of the beams having different wavelengths described above have respective minimum sizes at the same focus position.

Figure 14:
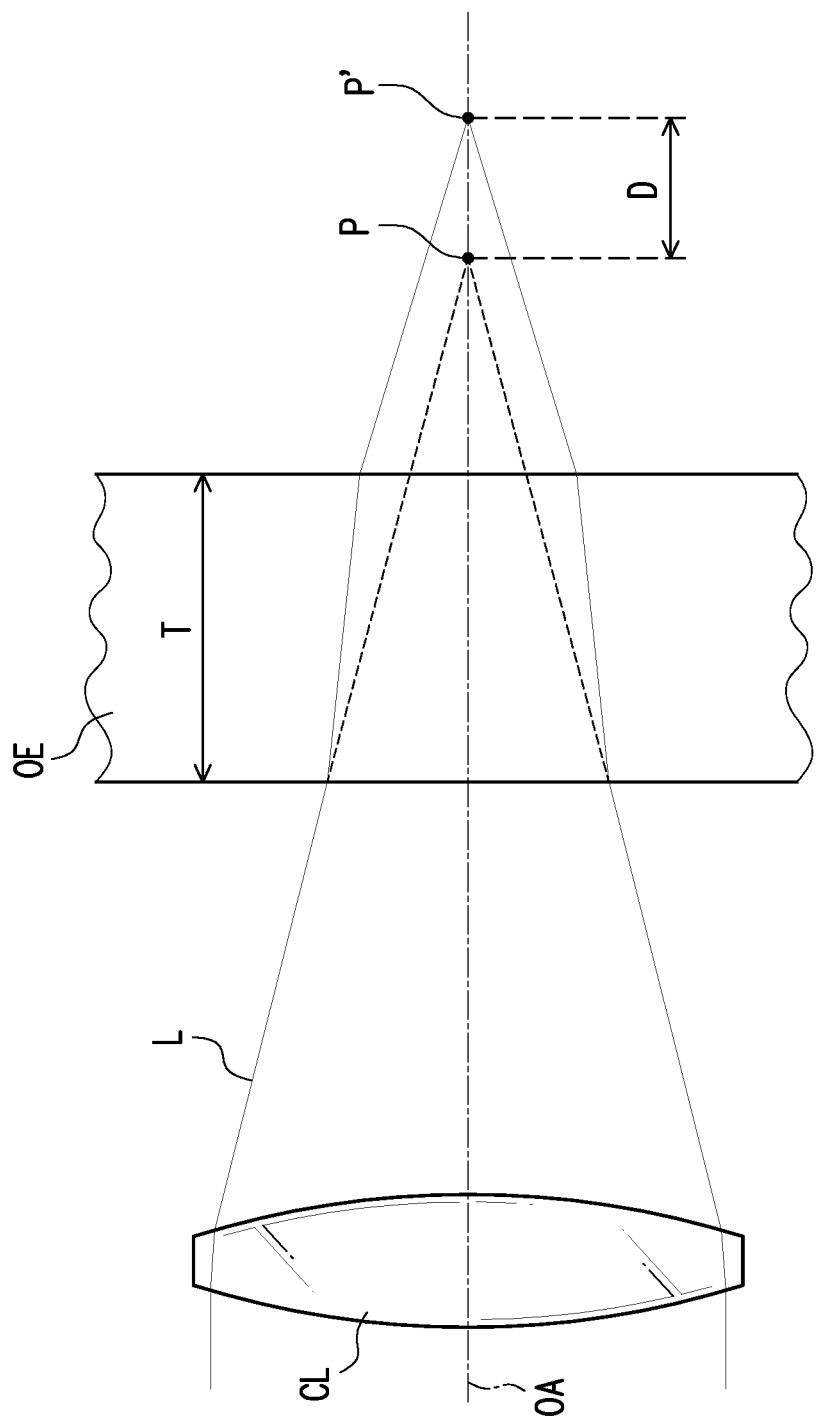
FIG. 14 is a schematic view showing a focus position of a beam.

For illustrative purposes, FIG. 14 is specifically illustrated to illustrate the relationship between the thickness and/or refractive index of the optical element and the focus position of the beam. Referring to FIG. 14, when the beam L only passes through the converging lens CL, the beam L is focused on the focus position P on the optical axis OA. If the optical element OE is disposed behind the converging lens CL, after the beam L passes through the converging lens CL and the optical element OE, the beam L will be focused on the focus position P' on the optical axis OA. The displacement D between the focus position P and the focus position P' is (n−1)t/n, where n is the value of the refractive index of the optical element OE with respect to the beam LB, and t is the value of the thickness T of the optical element OE. Therefore, the focus position P' of the beam L is changed by the adjustment of the refractive index and the thickness T of the optical element OE. Further, the larger the value n of the refractive index of the optical element OE with respect to the beam LB, the larger the displacement D is, and the larger the value t of the thickness T of the optical element OE, the larger the displacement D is.

That is, by adjusting the thickness and/or the refractive index of the first region 152, the second region 154 and the third region 156 of the optical element 150A, the focus positions of the beams having different wavelengths formed by the first region 152, the second region 154 and the third region 156 are adjusted respectively. Therefore, the first region 152, the second region 154 and the third region 156 of the optical element 150A respectively adjust the focus positions of the first beam (e.g., the blue beam) formed through the first region 152, the second beam (e.g., the green beam) formed through the second region 154 and the third beam (e.g., the red beam) formed through the third region 156 to substantially the same position, thereby eliminating the longitudinal chromatic aberration produced by the beams having different wavelengths after the beams pass through the converging lens 130 to improve the color uniformity.

In the embodiment, the wavelength of the first beam (e.g., the blue beam) formed through the first region 152 is, for example, less than the wavelength of the second beam (e.g., the green beam) formed through the second region 154. The wavelength of the second beam (e.g., the green beam) formed through the second region 154 is, for example, less than the wavelength of the third beam (e.g., the red beam) formed through the third region 156. Since the lens has a lower refractive index for a longer wavelength beam, the longer wavelength beam passes through the lens and is focused relatively far from the lens, and since the lens has a higher refractive index for a shorter wavelength beam, the shorter wavelength beam passes through the lens and is focused closer to the lens. Therefore, in an embodiment, the thickness T1 of the first region 152 is greater than the thickness T2 of the second region 154, and the thickness T2 of the second region 154 is greater than the thickness T3 of the third region 156, such that the displacement of the adjustable focus position of the first beam formed through the first region 152 is greater than the displacement of the adjustable focus position of the second beam formed through the second region 154 and the displacement of the adjustable focus position of the second beam formed through the second region 154 is greater than the displacement of the adjustable focus position of the third beam formed through the third region 156. In an embodiment, the refractive index of the first region 152 is greater than the refractive index of the second region 154, and the refractive index of the second region 154 is greater than the refractive index of the third region 156, such that the displacement of the adjustable focus position of the first beam formed through the first region 152 is greater than the displacement of the adjustable focus position of the second beam formed through the second region 154 and the displacement of the adjustable focus position of the second beam formed through the second region 154 is greater than the displacement of the adjustable focus position of the third beam formed through the third region 156. It should be noted that even though the thicknesses T1, T2 and T3 are different in FIG. 3B, in the embodiment, the thicknesses T1, T2 and T3 may be the same, that is, the displacement of the focus positions of the first beam, the second beam and the third beam is respectively adjusted by merely differentiating the refractive indices of the first region 152, the second region 154 and the third region 156. In an embodiment, the thickness T1 of the first region 152 is greater than the thickness T2 of the second region 154, and the thickness T2 of the second region 154 is greater than the thickness T3 of the third region 156, and meanwhile, the refractive index of the first region 152 is greater than the refractive index of the second region 154, and the refractive index of the second region 154 is greater than the refractive index of the third region 156, such that the displacement of the adjustable focus position of the first beam formed through the first region 152 is greater than the displacement of the adjustable focus position of the second beam formed through the second region 154 and the displacement of the adjustable focus position of the second beam formed through the second region 154 is greater than the displacement of the adjustable focus position of the third beam formed through the third region 156.

In detail, the first region 152, the second region 154 and the third region 156 of the optical element 150A are respectively made of different materials to form regions having different refractive indices respectively. In the embodiment, the materials of the first region 152, the second region 154 and the third region 156 contain optical glass mixed with different materials. The refractive indices of the first region 152, the second region 154 and the third region 156 fall, for example, in the range of 1.35 to 2.35. The refractive index here refers to the refractive index Nd of the medium at the Fraunhofer D line. For example, when the thicknesses of the first region 152, the second region 154 and the third region 156 are all equal and are, for example, 0.7 mm, the material of the first region 152 is optical glass BaK5 (barium crown 5, refractive index is about 1.557), the material of the second region 154 is optical glass BaLF5 (barium light flint 5, refractive index is about 1.547), and the material of the third region 156 is optical glass BK7 (borosilicate crown 7, refractive index is about 1.517). However, the invention is not limited thereto.

Further, in the embodiment, the difference in thickness between the first region 152 and the second region 154 of the optical element 150A, the difference in thickness between the second region 154 and the third region 156, or the difference in thickness between the first region 152 and the third region 156 is, for example, less than or equal to 1.0 mm. For example, when the material of the first region 152, the second region 154 and the third region 156 is, for example, the optical glass BK7, the thickness T1 of the first region 152 is 0.7 mm, the thickness T2 of the second region 154 is 0.69 mm, and the thickness T3 of the third region 156 is 0.685 mm. The difference in thickness between the first region 152 and the second region 154 is 0.01 mm, the difference in thickness between the second region 154 and the third region 156 is 0.005 mm, and the difference in thickness between the first region 152 and the third region 156 is 0.015 mm. However, the invention is not limited thereto.

Referring to FIG. 4A and FIG. 4B, the optical element 150B of FIG. 4A and FIG. 4B is similar to the optical element 150A of FIG. 3A and FIG. 3B, except that the optical element 150A of FIG. 3A and FIG. 3B is configured to rotate about a rotation axis thereof, such that the first region 152, the second region 154 and the third region 156 sequentially adjust the focus positions of the first beam (e.g., the blue beam) formed through the first region 152, the second beam (e.g., the green beam) formed through the second region 154 and the third beam (e.g., the red beam) formed through the third region 156 to substantially the same position respectively. The optical element 150B of the embodiment is configured to move on the plane perpendicular to the optical axis, such that the first region 152, the second region 154 and the third region 156 sequentially adjust the focus positions of the first beam (e.g., the blue beam) formed through the first region 152, the second beam (e.g., the green beam) formed through the second region 154 and the third beam (e.g., the red beam) formed through the third region 156 to substantially the same position respectively. In detail, the optical element 150B is connected to an actuator (e.g., a motor) such that the optical element 150B moves in at least one dimension. In the embodiment, the optical element 150B moves, for example, in an up-down direction in FIG. 4A. In other embodiments, the optical element 150B also moves in the up-down direction in FIG. 4A while moving at a small amplitude in a left-right direction in FIG. 4A, but the invention is not limited thereto. In addition, it should be noted that even though FIG. 4B illustrates that the thicknesses T1, T2 and T3 are different, in some embodiments, the thicknesses T1, T2 and T3 may be the same.

Referring to FIG. 5A and FIG. 5B, the optical element 150C in FIG. 5A and FIG. 5B is similar to the optical element 150A in FIG. 3A and FIG. 3B, except that the optical element 150C in FIG. 5A and FIG. 5B includes only the first region 152 and the second region 154. For example, the first region 152 is a light transmissive region, and is configured, for example, with a diffuser, a diffusion particle, or a diffusion structure for reducing or eliminating a laser speckle phenomenon of the light source beam LB. The first region 152 is also a blue filter region for being penetrated by a beam having a blue band range and filtering out beams of other band ranges. The second region 154 is also a yellow filter region for being penetrated by a beam having a yellow band range and filtering out beams of other band ranges.

In detail, in the embodiment, the optical element 150C is configured to rotate about a rotation axis thereof such that the first region 152 and the second region 154 of the optical element 150C sequentially cut into the transmission paths of the light source beam LB and the converted beam CB from the wavelength conversion element 120 respectively. When the first region 152 cuts into the transmission path of the light source beam LB, the light source beam LB passes through the first region 152 or is filtered to form a blue beam. When the second region 154 cuts into the transmission path of the converted beam CB, the converted beam CB is filtered to form a yellow beam. It should be noted that the wavelength conversion element 120 corresponding to the embodiment is the wavelength conversion element 120A shown in FIG. 2A, the first region 152 of the optical element 150C corresponds to the optical region 124 of the wavelength conversion element 120A, and the second region 154 of the optical element 150C corresponds to the wavelength conversion region 122 of the wavelength conversion element 120A.

In the embodiment, the first region 152 and the second region 154 meet at least one of the following conditions: the thicknesses of the first region 152 and the second region 154 are different; and the refractive indices of the first region 152 and the second region 154 are different. The first region 152 and the second region 154 respectively adjust the focus positions of the light source beam LB and the converted beam CB to substantially the same position. Further, the first region 152 and the second region 154 respectively adjust the focus positions of a first beam (e.g., a blue beam) formed through the first region 152 and a second beam (e.g., a yellow beam) formed through the second region 154 to substantially the same position.

In the embodiment, the wavelength of the first beam (e.g., the blue beam) formed through the first region 152 is, for example, less than the wavelength of the second beam (e.g., the yellow beam) formed through the second region 154. Therefore, in an embodiment, the thickness T1 of the first region 152 is greater than the thickness T4 of the second region 154 such that the displacement of the adjustable focus position of the first beam formed through the first region 152 is greater than the displacement of the adjustable focus position of the second beam formed through the second region 154. Therefore, in an embodiment, the refractive index of the first region 152 is greater than the refractive index of the second region 154 such that the displacement of the adjustable focus position of the first beam formed through the first region 152 is greater than the displacement of the adjustable focus position of the second beam formed through the second region 154. It should be noted that even though the thicknesses T1 and T4 are different in FIG. 5B, in the embodiment, the thicknesses T1 and T4 may be the same, that is, the displacement of the focus positions of the first beam and the second beam is respectively adjusted by merely differentiating the refractive indices of the first region 152 and the second region 154. In an embodiment, the thickness T1 of the first region 152 is greater than the thickness T4 of the second region 154, and the refractive index of the first region 152 is less than the refractive index of the second region 154 such that the displacement of the adjustable focus position of the first beam formed through the first region 152 is greater than the displacement of the adjustable focus position of the second beam formed through the second region 154.

Referring to FIG. 6A and FIG. 6B, the optical element 150D of FIG. 6A and FIG. 6B is similar to the optical element 150C of FIG. 5A and FIG. 5B, except that the optical element 150C of FIG. 5A and FIG. 5B is configured to rotate about a rotation axis thereof, such that the first region 152 and the second region 154 sequentially adjust the focus positions of the first beam (e.g., the blue beam) formed through the first region 152 and the second beam (e.g., the yellow beam) formed through the second region 154 to substantially the same position respectively. The optical element 150D of the embodiment is configured to move on the plane perpendicular to the optical axis, such that the first region 152 and the second region 154 sequentially adjust the focus positions of the first beam (e.g., the blue beam) formed through the first region 152 and the second beam (e.g., the yellow beam) formed through the second region 154 to substantially the same position respectively. In detail, the optical element 150D is connected to an actuator (e.g., a motor) such that the optical element 150D moves in at least one dimension. In the embodiment, the optical element 150D moves, for example, in an up-down direction in FIG. 6A. In other embodiments, the optical element 150D also moves in the up-down direction in FIG. 6A while moving at a small amplitude in a left-right direction in FIG. 6A, but the invention is not limited thereto. In addition, it should be noted that even though FIG. 6B illustrates that the thicknesses T1 and T4 are different, in some embodiments, the thicknesses T1 and T4 may be the same.

When the optical element 150 in FIG. 1 is any one of the optical element 150C shown in FIG. 5A and FIG. 5B and the optical element 150D shown in FIG. 6A and FIG. 6B, the projection apparatus 200 includes two light valves, to modulate the illumination beam IB into an image beam IMB.

Based on the above, the optical element 150 of the embodiment of the invention includes at least two regions (for example, the optical element 150A and the optical element 150B are exemplified by three regions, and the optical element 150C and the optical element 150D are exemplified by two regions), and the at least two regions respectively adjust the focus positions of the beams having different wavelengths formed through the at least two regions to substantially the same position, thereby eliminating the longitudinal chromatic aberration produced by the beams having different wavelengths after the beams pass through the converging lens 130 to improve the color uniformity. The projection apparatus 200 of the embodiment of the invention includes the above-described optical element 150, and thus, has good imaging quality. It should be noted that in other embodiments, the optical element 150 also has four or more regions, and the invention is not limited thereto.

It is worth mentioning that the optical element 150 of the embodiment simultaneously has the function of filtering and the function of adjusting the focus position of the beam, and does not need to set two different elements to achieve the above two functions respectively, so that the volume of the projection apparatus 200 is not additionally increased.

Referring to FIG. 1 again, in the embodiment, the illumination system 100 further includes a light combining module 160, a light transmission module 170, and a plurality of lenses C1, C2, C3 and C4. The light combining module 160 is located between the light source module 110 and the wavelength conversion element 120, and is located on the transmission paths of the light source beam LB from the light source module 110, the light source beam LB penetrating the wavelength conversion element 120, and the converted beam CB from the wavelength conversion element 120. The light transmission module 170 includes a plurality of reflectors 172 and a plurality of lenses 174. The light transmission module 170 is located on the transmission path of the light source beam LB penetrating the wavelength conversion element 120 and is configured to transmit the light source beam LB penetrating the wavelength conversion element 120 back to the light combining module 160. The plurality of lenses C1, C2, C3 and C4 are configured to adjust the beam path inside the illumination system 100.

Specifically, the light combining module 160 is, for example, a dichroic mirror (DM) or a dichroic prism, and provides different optical effects on beams of different colors. For example, for example, the light combining module 160 is penetrated by a blue beam while providing reflection for other beams (e.g., red, green or yellow beams). In the embodiment, the light combining module 160 is designed to be penetrated by the light source beam LB and reflect the converted beam CB. Therefore, the light combining module 160 transmits the light source beam LB from the light source module 110 to the wavelength conversion element 120, and after the light transmission module 170 transmits the light source beam LB penetrating the wavelength conversion element 120 to the light combining module 160, the light combining module 160 combines the converted beam CB from the wavelength conversion element 120 with the light source beam LB penetrating the wavelength conversion element 120 and transmits the combined beam to the converging lens 130 and the optical element 150.

In the embodiment, the light homogenizing element 140 refers to an optical element that homogenizes the beam passing through the light homogenizing element 140. In the embodiment, the light homogenizing element 140 is disposed on the transmission paths of the light source beam LB and the converted beam CB from the light combining module 160. In the embodiment, the light homogenizing element 140 is, for example, an integration rod. In other embodiments, the light homogenizing element 140 is also a lens array or other optical element having a light homogenizing effect.

It should be noted here that the following embodiments use some of the foregoing embodiments, and the description of the same technical content is omitted. For the same component names, reference is made to some of the foregoing embodiments, and the following embodiments are not described repeatedly.

Figure 7:
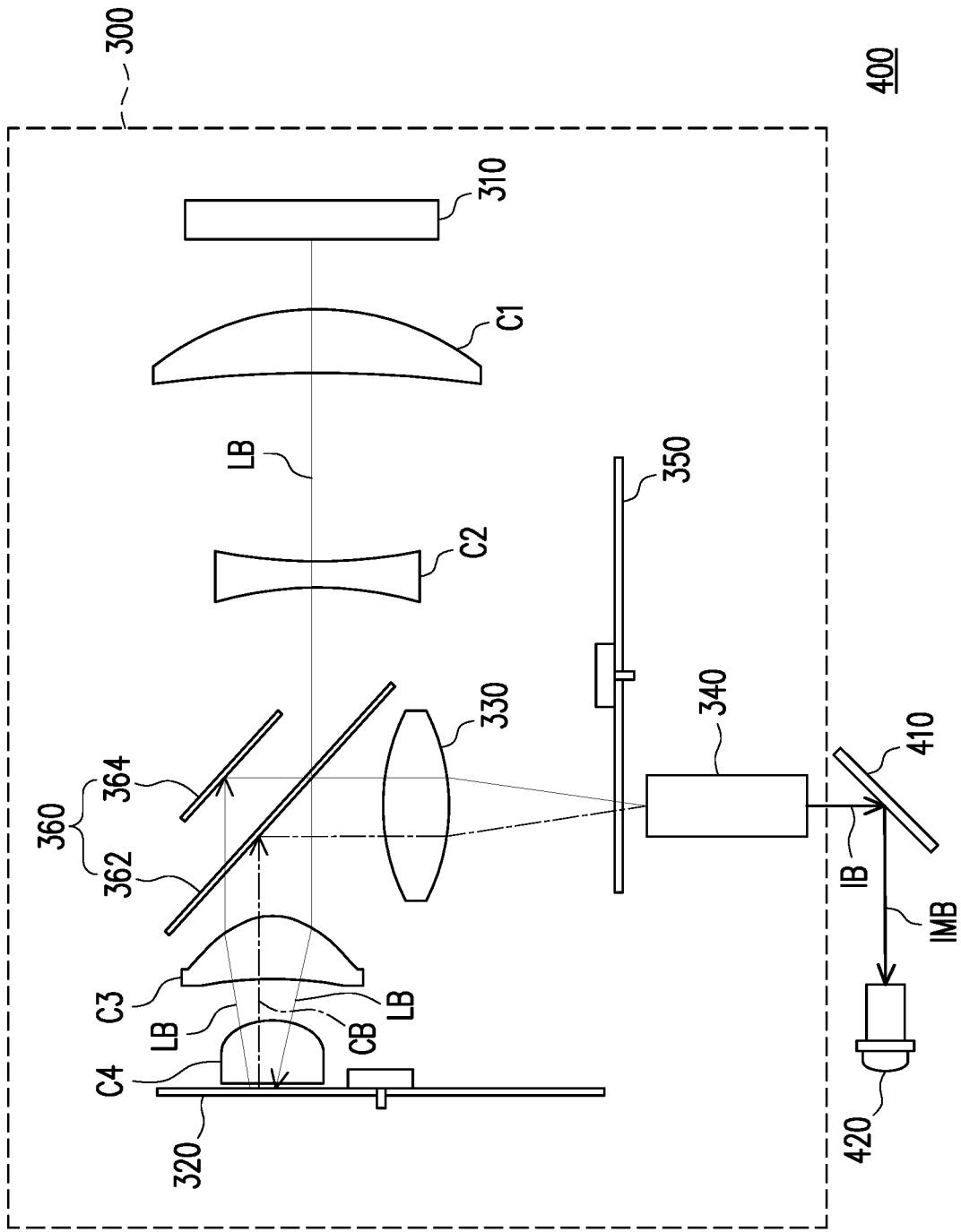
FIG. 7 is a schematic view of a projection apparatus according to a second embodiment of the invention.

FIG. 7 is a schematic view of a projection apparatus according to a second embodiment of the invention. The projection apparatus 400 of the second embodiment of FIG. 7 includes an illumination system 300, a light valve 410 and a projection lens 420. The illumination system 300 is configured to emit an illumination beam IB. In the embodiment shown in FIG. 7, the light source module 310, the converging lens 330, the light homogenizing element 340, the optical element 350, the light valve 410 and the projection lens 420 are configured and operated in a similar manner to the light source module 110, the converging lens 130, the light homogenizing element 140, the optical element 150, the light valve 210 and the projection lens 220 of the first embodiment, which will not be described herein. Referring to FIG. 7, the main difference between the projection apparatus 400 of the embodiment and the projection apparatus 200 of FIG. 1 is that the wavelength conversion element 120 of the projection apparatus 200 is a transmissive wavelength conversion element, and the wavelength conversion element 320 of the embodiment is a reflective wavelength conversion element, and the embodiment is not configured with the light transmission module 170 as that in the first embodiment of FIG. 1.

Figure 8B:
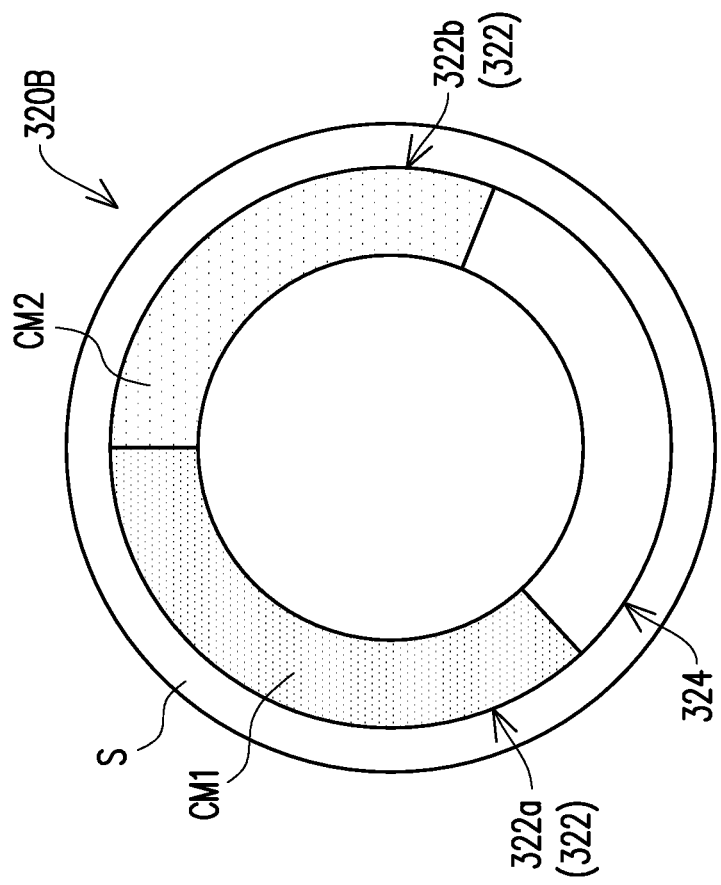
FIG. 8B is a schematic front view of a wavelength conversion element according to another embodiment of the invention.
Figure 8A:
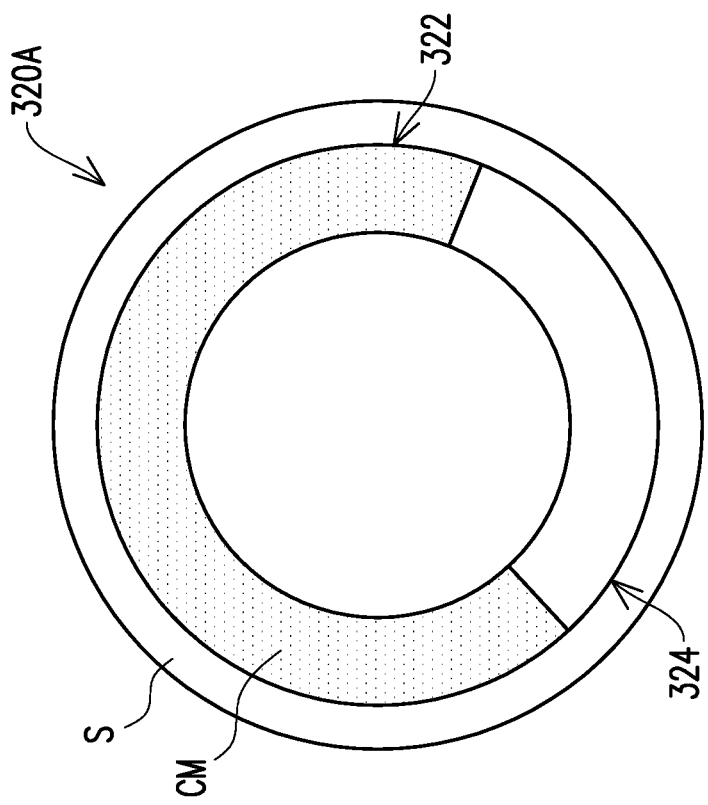
FIG. 8A is a schematic front view of a wavelength conversion element according to an embodiment of the invention.

FIG. 8A is a schematic front view of a wavelength conversion element according to an embodiment of the invention. FIG. 8B is a schematic front view of a wavelength conversion element according to another embodiment of the invention. The wavelength conversion element 320 in FIG. 7 is the wavelength conversion element 320A shown in FIG. 8A or the wavelength conversion element 320B shown in FIG. 8B. In detail, the optical region 124 of the wavelength conversion element 120 is a transmissive region, and the optical region 324 of the wavelength conversion element 320 of the embodiment is a reflective region. The optical region 324 is, for example, a part of the substrate S or a coating layer having high reflectivity, for example, a coating layer using a compound containing silver.

Referring to FIG. 7 and FIG. 8A, in the embodiment, the wavelength conversion region 322 and the optical region 324 alternately cut into the transmission path of the light source beam LB. When the wavelength conversion region 322 cuts into the transmission path of the light source beam LB, the wavelength conversion material CM is excited by the light source beam LB to emit a converted beam CB, and the converted beam CB is reflected by the substrate S. When the optical region 324 cuts into the transmission path of the light source beam LB, the light source beam LB is reflected by the optical region 324 of the wavelength conversion element 320A and is output from the optical region 324.

Referring to FIG. 7 and FIG. 8B, in the embodiment, the first conversion region 322a and the second conversion region 322b of the wavelength conversion region 322 and the optical region 324 alternately cut into the transmission path of the light source beam LB. When the first conversion region 322a and the second conversion region 322b of the wavelength conversion region 322 sequentially cut into the transmission path of the light source beam LB, the wavelength conversion material CM1 and the wavelength conversion material CM2 are sequentially excited by the light source beam LB to emit a converted beam CB, and the converted beam CB is reflected by the substrate S. When the optical region 324 cuts into the transmission path of the light source beam LB, the light source beam LB is reflected by the optical region 324 of the wavelength conversion element 320B and is output from the optical region 324.

In the embodiment, a light combining module 360 of the illumination system 300 includes a dichroic unit 362 and a reflection unit 364. The light combining module 360 is located between the light source module 310 and the wavelength conversion element 320, and is located on the transmission paths of the light source beam LB from the light source module 310 and the converted beam CB and the light source beam LB from the wavelength conversion element 320. The reflection unit 364 is disposed on a side, adjacent to the light source module 310, of the dichroic unit 362. The light combining module 360 combines the converted beam CB from the wavelength conversion element 320 with the light source beam LB. Specifically, the dichroic unit 362 is, for example, a dichroic mirror (DM) or a dichroic prism, and provides different optical effects on beams of different colors. The reflection unit 364 is a reflector. For example, the dichroic unit 362 is penetrated by, for example, a blue beam while providing reflection for other beams (e.g., red, green or yellow beams). In the embodiment, the dichroic unit 362 is designed, for example, to be penetrated by the light source beam LB and reflects the converted beam CB. Therefore, the dichroic unit 362 transmits the light source beam LB from the light source module 310 to the wavelength conversion element 320, and allows the light source beam LB reflected by the wavelength conversion element 320 to pass through and be transmitted to the reflection unit 364, and then the light source beam LB is reflected by the reflection unit 364 and penetrates the dichroic unit 362 to be transmitted to a focusing lens 330 and the optical element 350. That is, the dichroic unit 362 combines the converted beam CB from the wavelength conversion element 320 with the light source beam LB reflected by the reflection unit 364 and transmits the combined beam to the focusing lens 330 and the optical element 350.

The optical element 350 of the embodiment is the same or similar to the optical element 150 of FIG. 1, which is any one of the optical element 150A shown in FIG. 3A and FIG. 3B, the optical element 150B shown in FIG. 4A and FIG. 4B, the optical element 150C shown in FIG. 5A and FIG. 5B and the optical element 150D shown in FIG. 6A and FIG. 6B. For the same description, reference can be made to the first embodiment, and details are not described herein again.

Figure 9:
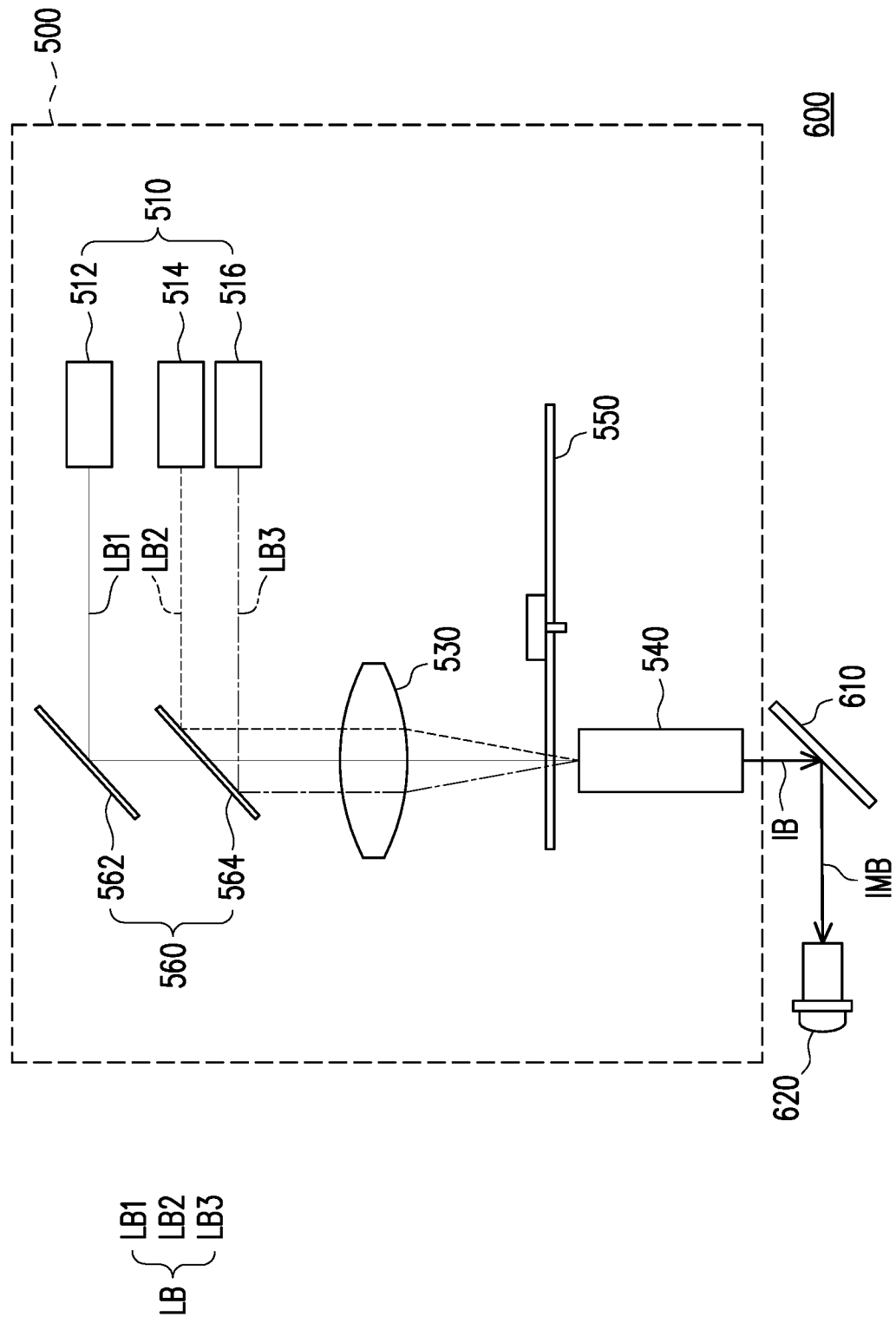
FIG. 9 is a schematic view of a projection apparatus according to a third embodiment of the invention.

FIG. 9 is a schematic view of a projection apparatus according to a third embodiment of the invention. The projection apparatus 600 of the third embodiment of FIG. 9 includes an illumination system 500, a light valve 610 and a projection lens 620. The illumination system 500 is configured to emit an illumination beam IB. In the embodiment shown in FIG. 9, the converging lens 530, the light homogenizing element 540, the light valve 610 and the projection lens 620 are arranged and operated in a similar manner to the converging lens 130, the light homogenizing element 140, the light valve 210 and the projection lens 220 of the first embodiment, which will not be described herein.

Referring to FIG. 9, the main difference between the projection apparatus 600 of the embodiment and the projection apparatus 200 of FIG. 1 is that the light source beam LB emitted by the light source module 510 of the embodiment includes a first light source beam LB1, a second light source beam LB2 and a third light source beam LB3 having different wavelengths, and the embodiment is not configured with the wavelength conversion element 120 as that in the first embodiment of FIG. 1. Specifically, the light source module 510 includes a first light source 512, a second light source 514 and a third light source 516. The first light source 512, the second light source 514 and the third light source 516 respectively emit the first light source beam LB1, the second light source beam LB2 and the third light source beam LB3 having different wavelengths. The first light source beam LB1, the second light source beam LB2, and the third light source beam LB3 are each, for example, one of a blue beam, a green beam and a red beam. In an embodiment, the first light source 512, the second light source 514 and the third light source 51 of the light source module 510 are respectively an array or group of laser diodes (LDs). In another embodiment, the first light source 512, the second light source 514 and the third light source 51 of the light source module 510 are respectively an array or group of light emitting diodes (LEDs).

In the embodiment, the illumination system 500 includes a controller (not shown) to respectively control the switches of the first light source 512, the second light source 514 and the third light source 516, such that the first light source 512, the second light source 514 and the third light source 516 sequentially emit the first light source beam LB1, the second light source beam LB2 and the third light source beam LB3 respectively. In the embodiment, the specific block of the optical element 550 corresponds to a specific light source through sequence control, and thus the position of the light source has a large degree of freedom.

Figure 11:
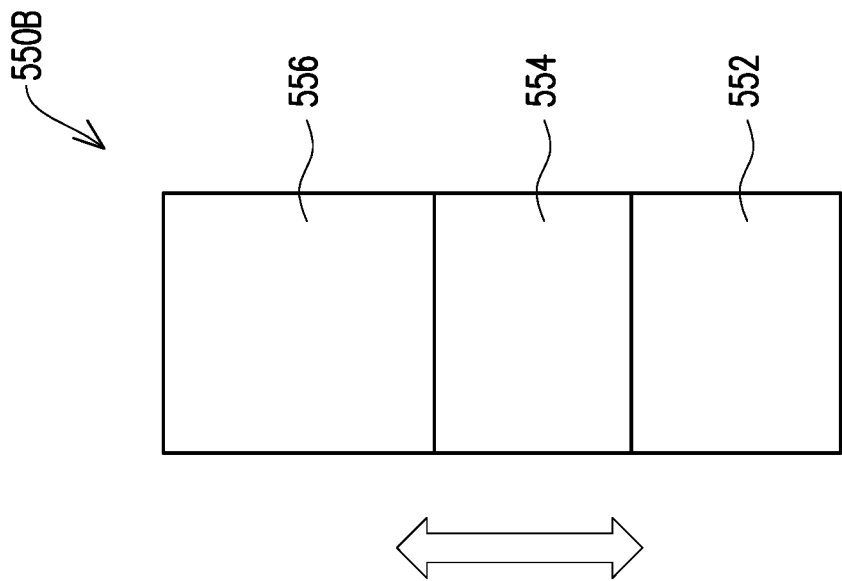
FIG. 11 is a schematic front view of an optical element according to another embodiment of the invention.
Figure 10:
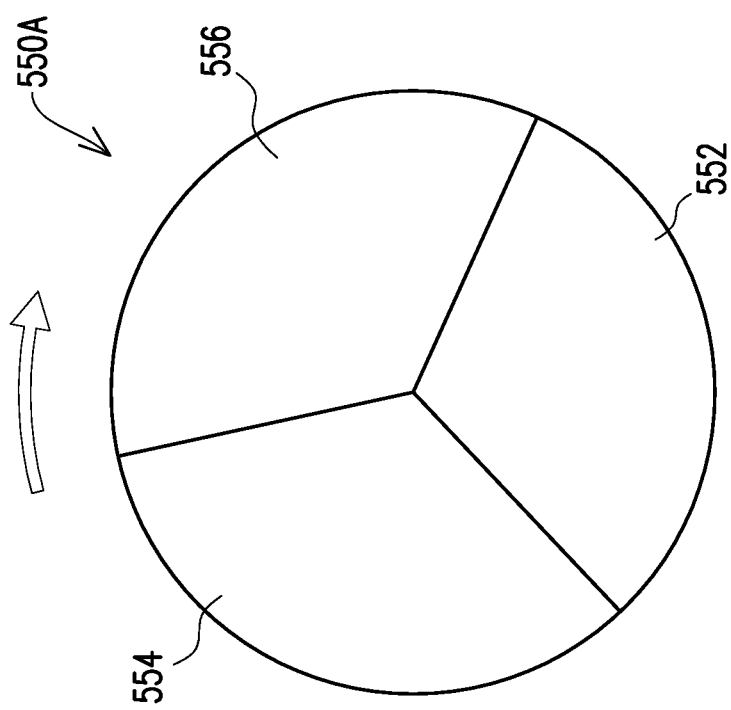
FIG. 10 is a schematic front view of an optical element according to an embodiment of the invention.
Figure 13:
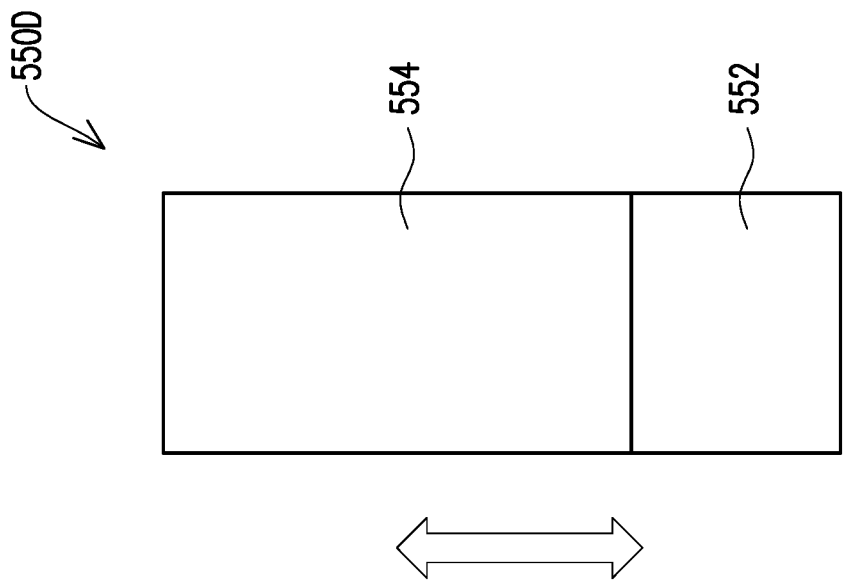
FIG. 13 is a schematic front view of an optical element according to yet another embodiment of the invention.
Figure 12:
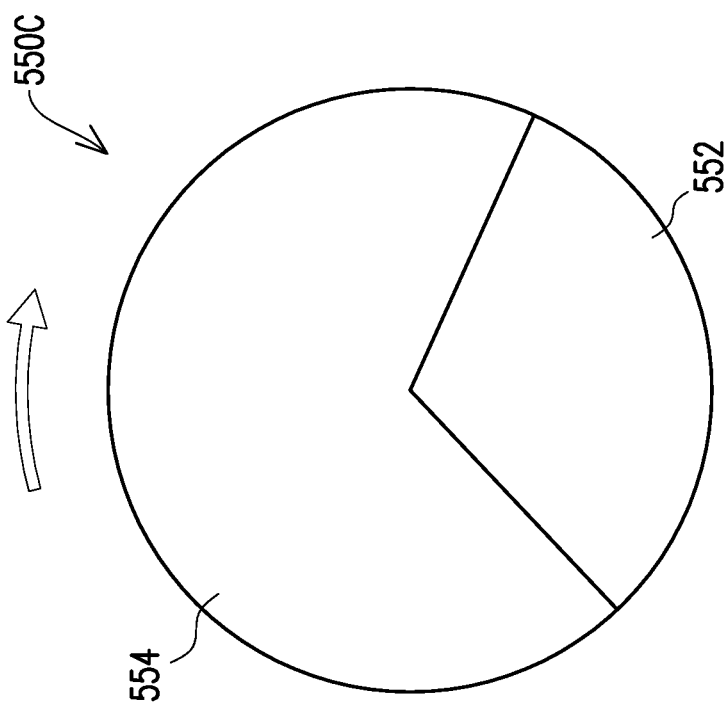
FIG. 12 is a schematic front view of an optical element according to still another embodiment of the invention.

FIG. 10 is a schematic front view of an optical element according to an embodiment of the invention. FIG. 11 is a schematic front view of an optical element according to another embodiment of the invention. FIG. 12 is a schematic front view of an optical element according to still another embodiment of the invention. FIG. 13 is a schematic front view of an optical element according to yet another embodiment of the invention. The optical element 550 in FIG. 9 is any one of the optical element 550A shown in FIG. 10, the optical element 550B shown in FIG. 11, the optical element 550C shown in FIG. 12, and the optical element 550D shown in FIG. 13.

Referring to FIG. 10 and FIG. 11, the optical element 550A of FIG. 10 is similar to the optical element 150A of FIG. 3A and FIG. 3B, and the optical element 550B of FIG. 11 is similar to the optical element 150B of FIG. 4A and FIG. 4B, except that the light source module 510 of the embodiment emits beams having different wavelengths, and thus the first region 552, the second region 554 and the third region 556 of the optical element 550 (the optical element 550A of FIG. 10 or the optical element 550B of FIG. 11) may not be filter regions.

In the embodiment, the optical element 550 is configured to rotate about a rotation axis thereof (as shown by the optical element 550A of FIG. 10) or to move in the plane perpendicular to the optical axis (as shown by the optical element 550B of FIG. 11), such that the first region 552, the second region 554 and the third region 556 of the optical element 550A sequentially cut into the transmission paths of the first light source beam LB1, the second light source beam LB2 and the third light source beam LB3 from the light source module 110 respectively, and respectively adjust the focus positions of the first light source beam LB1, the second light source beam LB2 and the third light source beam LB3 to substantially the same position. In an embodiment, when the light source module 510 is an array or a group of laser diodes, the first region 552, the second region 554 and the third region 556 of the optical element 550 are respectively a diffusion region, for example, a diffuser, a diffusion particle, or a diffusion structure. The first region 552, the second region 554 and the third region 556 are respectively configured to reduce or eliminate the laser speckle phenomenon of the first light source beam LB1, the second light source beam LB2 and the third light source beam LB3. In another embodiment, when the light source module 510 is an array or group of light emitting diodes, the first region 552, the second region 554 and the third region 556 of the optical element 550 are respectively a transparent region.

Relevant description of the thickness and refractive index of the optical element 550A of FIG. 10 and the optical element 550B of FIG. 11 are referred to the embodiment of FIG. 3A and FIG. 3B and the embodiment of FIG. 4A and FIG. 4B respectively. The region corresponding to the shorter wavelength beam has a larger thickness and/or a larger refractive index, and the region corresponding to the longer wavelength beam has a smaller thickness and/or a smaller refractive index, which will not be described herein.

Referring to FIG. 12 and FIG. 13, the optical element 550C of FIG. 12 is similar to the optical element 150C of FIG. 5A and FIG. 5B, and the optical element 550D of FIG. 13 is similar to the optical element 150D of FIG. 6A and FIG. 6B, except for the difference that the light source module 510 of the embodiment emits beams having different wavelengths, and thus the first region 552 and the second region 554 of the optical element 550 (the optical element 550C of FIG. 12 or the optical element 550D of FIG. 13) may not be filter regions.

In the embodiment, the optical element 550 is configured to rotate about the rotation axis thereof (as shown by the optical element 550C of FIG. 12) or to move in the plane perpendicular to the optical axis (as shown by the optical element 550D of FIG. 13), such that the first region 552 and the second region 554 of the optical element 550A sequentially cut into the transmission paths of the first light source beam LB1 from the first light source 512, and the second light source beam LB2 and the third light source beam LB3 from the second light source 514 and the third light source 516 respectively, and respectively adjust the focus positions of the first light source beam LB1, and the second light source beam LB2 and the third light source beam LB3 to substantially the same position. In an embodiment, when the light source module 510 is an array or a group of laser diodes, the first region 552 and the second region 554 of the optical element 550 are respectively a diffusion region, for example, a diffuser, a diffusion particle, or a diffusion structure. The first region 552 is configured to reduce or eliminate the laser speckle phenomenon of the first light source beam LB1, and the second region 554 is configured to reduce or eliminate the laser speckle phenomenon of the second light source beam LB2 and the third light source beam LB3. In another embodiment, when the light source module 510 is an array or group of light emitting diodes, the first region 552 and the second region 554 of the optical element 550 are respectively a transparent region.

It should be noted that in the embodiment, the second light source beam LB2 and the third light source beam LB3 are two beams having similar wavelengths, so that the focus positions are adjusted through the same region. For example, the second light source beam LB2 and the third light source beam LB3 are respectively one of a green beam and a red beam, and the first light source beam LB1 is a blue beam. Alternatively, the second light source beam LB2 and the third light source beam LB3 are respectively one of a blue beam and a green beam, and the first light source beam LB1 is a red beam.

Relevant description of the thickness and refractive index of the optical element 550C of FIG. 12 and the optical element 550D of FIG. 13 are referred to the embodiment of FIG. 5A and FIG. 5B and the embodiment of FIG. 6A and FIG. 6B respectively. The region corresponding to the shorter wavelength beam has a larger thickness and/or a larger refractive index, and the region corresponding to the longer wavelength beam has a smaller thickness and/or a smaller refractive index, which will not be described herein.

It is worth mentioning that when the light source module 510 is an array or a group of laser diodes, the optical element 550 of the embodiment simultaneously has a function of diffusing and a function of adjusting the focus position of the beam, and does not need to set two different elements to achieve the above two functions respectively, so that the volume of the projection apparatus 600 is not additionally increased.

Referring to FIG. 9 again, in the embodiment, the light combining module 560 of the illumination system 500 includes a reflection unit 562 and a dichroic unit 564. The reflection unit 562 is disposed on the transmission path of the first light source beam LB1, and the dichroic unit 564 is disposed on the transmission paths of the first light source beam LB1 from the reflection unit 562, and the second light source beam LB2 and the third light source beam LB3 from the second light source 514 and the third light source 516. The reflection unit 562 is a reflector. The dichroic unit 564 is a dichroic mirror (DM) or a dichroic prism. In the embodiment, the dichroic unit 564 is designed, for example, to be penetrated by the first light source beam LB1 and reflect the second light source beam LB2 and the third light source beam LB3. Therefore, the light combining module 560 transmits the first light source beam LB1, the second light source beam LB2 and the third light source beam LB3 to the converging lens 530 and the optical element 550.

Based on the above, the first region and the second region of the optical element of the embodiments of the invention meet at least one of the following conditions: the thicknesses of the first region and the second region are different; and the refractive indices of the first region and the second region are different. That is, by adjusting the thickness and/or the refractive index of the first region and the second region of the optical element, the focus positions of the beams having different wavelengths formed through the first region and the second region are respectively adjusted. Therefore, the first region and the second region of the optical element respectively adjust the focus positions of the first beam formed through the first region and the second beam formed through the second region to substantially the same position, thereby eliminating the longitudinal chromatic aberration produced by the beams having different wavelengths after the beams pass through the converging lens to improve the color uniformity. The projection apparatus of the embodiments of the invention includes the above-described optical element, and thus, has good imaging quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be configured to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical element, wherein the optical element is disposed between a light homogenizing element and a converging lens, the optical element comprises at least two regions, and the at least two regions comprise a first region and a second region, wherein the first region and the second region respectively adjust focus positions of a first beam formed through the first region and a second beam formed through the second region to the same position, the first beam and the second beam have different wavelengths, and the first region and the second region meet at least one of the following conditions:
   (1) a wavelength of the first beam is less than a wavelength of the second beam, and a thickness of the first region is greater than a thickness of the second region; and
   (2) the wavelength of the first beam is less than the wavelength of the second beam, and a refractive index of the first region is greater than a refractive index of the second region.

2. The optical element according to claim 1, wherein the optical element is configured to rotate about a rotation axis thereof such that the first region and the second region sequentially adjust the focus positions of the first beam and the second beam to the same position respectively.

3. The optical element according to claim 1, wherein the optical element is configured to move on a plane perpendicular to an optical axis such that the first region and the second region sequentially adjust the focus positions of the first beam and the second beam to the same position respectively.

4. The optical element according to claim 1, wherein the areas of the first region and the second region are different.

5. The optical element according to claim 1, wherein at least one of the first region and the second region is a filter region.

6. The optical element according to claim 1, wherein at least one of the first region and the second region is a diffusion region.

7. The optical element according to claim 1, wherein each of the first region and the second region is only a transparent region.

8. The optical element according to claim 1, wherein the at least two regions of the optical element further comprise a third region, wherein the first region, the second region and the third region respectively adjust focus positions of the first beam, the second beam and a third beam formed through the third region to the same position, and the first region, the second region and the third region meet at least one of the following conditions:
(1) the wavelength of the first beam is less than the wavelength of the second beam, the wavelength of the second beam is less than the wavelength of the third beam, the thickness of the first region is greater than the thickness of the second region, and the thickness of the second region is greater than the thickness of the third region; and
(2) the wavelength of the first beam is less than the wavelength of the second beam, the wavelength of the second beam is less than the wavelength of the third beam, the refractive index of the first region is greater than the refractive index of the second region, and the refractive index of the second region is greater than the refractive index of the third region.

9. A projection apparatus, wherein the projection apparatus comprises:
an illumination system, configured to emit an illumination beam, and wherein the illumination system comprises:
  a light source module, configured to emit a light source beam;
  a converging lens, disposed on a transmission path of the light source beam;
  a light homogenizing element, disposed on the transmission path of the light source beam from the converging lens; and
  an optical element, disposed between the light homogenizing element and the converging lens and located on the transmission path of the light source beam, wherein the optical element comprises at least two regions, and the at least two regions comprise a first region and a second region, wherein the first region and the second region are configured to respectively adjust focus positions of a first beam formed through the first region and a second beam formed through the second region to the same position, and the first region and the second region meet at least one of the following conditions:
    (1) a wavelength of the first beam is less than a wavelength of the second beam, and a thickness of the first region is greater than a thickness of the second region; and
    (2) the wavelength of the first beam is less than the wavelength of the second beam, and a refractive index of the first region is greater than a refractive index of the second region;
a light valve, disposed on a transmission path of the illumination beam to modulate the illumination beam into an image beam; and
a projection lens, disposed on a transmission path of the image beam.

10. The projection apparatus according to claim 9, wherein the illumination system further comprises a wavelength conversion element, the wavelength conversion element comprises a wavelength conversion region and an optical region, the wavelength conversion region and the optical region sequentially cut into the transmission path of the light source beam, and the wavelength conversion region is provided with at least one wavelength conversion material, when the wavelength conversion region cuts into the transmission path of the light source beam, the at least one wavelength conversion material is excited by the light source beam to emit a converted beam, and when the optical region cuts into the transmission path of the light source beam, the light source beam penetrates the optical region or is reflected by the optical region, wherein the converging lens and the optical element are further disposed on the transmission path of the converted beam.

11. The projection apparatus according to claim 10, wherein the optical element is configured to rotate about a rotation axis thereof or to move on a plane perpendicular to an optical axis such that the first region and the second region sequentially cut into the transmission paths of the light source beam and the converted beam respectively, and the first region and the second region respectively adjust the focus positions of the light source beam and the converted beam to the same position.

12. The projection apparatus according to claim 11, wherein the second region is a filter region.

13. The projection apparatus according to claim 11, wherein the thickness of the first region is greater than the thickness of the second region.

14. The projection apparatus according to claim 11, wherein the refractive index of the first region is greater than the refractive index of the second region.

15. The projection apparatus according to claim 9, wherein the light source beam comprises a first light source beam and a second light source beam having different wavelengths.

16. The projection apparatus according to claim 15, wherein the optical element is configured to rotate about a rotation axis thereof or to move on a plane perpendicular to an optical axis such that the first region and the second region sequentially cut into transmission paths of the first light source beam and the second light source beam respectively, and the first region and the second region respectively adjust the focus positions of the first light source beam and the second light source beam to the same position.

17. The projection apparatus according to claim 16, wherein the first region and the second region are respectively a diffusion region.

18. The projection apparatus according to claim 16, wherein the first region and the second region are respectively a transparent region.

19. The projection apparatus according to claim 16, wherein the wavelength of the first light source beam is less than the wavelength of the second light source beam, and the thickness of the first region is greater than the thickness of the second region.

20. The projection apparatus according to claim 16, wherein the wavelength of the first light source beam is less than the wavelength of the second light source beam, and the refractive index of the first region is greater than the refractive index of the second region.

21. The projection apparatus according to claim 9, wherein the areas of the first region and the second region are different.

22. The projection apparatus according to claim 9, wherein the at least two regions of the optical element further comprise a third region, wherein the first region, the second region and the third region respectively adjust focus positions of the first beam formed through the first region, the second beam formed through the second region and a third beam formed through the third region to the same position, the illumination beam comprises the first beam, the second beam and the third beam, and the first region, the second region and the third region meet at least one of the following conditions:
(1) the wavelength of the first beam is less than the wavelength of the second beam, the wavelength of the second beam is less than the wavelength of the third beam, the thickness of the first region is greater than the thickness of the second region, and the thickness of the second region is greater than the thickness of the third region; and
(2) the wavelength of the first beam is less than the wavelength of the second beam, the wavelength of the second beam is less than the wavelength of the third beam, the refractive index of the first region is greater than the refractive index of the second region, and the refractive index of the second region is greater than the refractive index of the third region.

* * * * *